United States Patent
Esch et al.

(10) Patent No.: US 9,888,428 B2
(45) Date of Patent: Feb. 6, 2018

(54) MOBILE RADIO COMMUNICATION DEVICES AND METHODS FOR CONTROLLING A MOBILE RADIO COMMUNICATION DEVICE

(75) Inventors: Michael Esch, Nuremberg (DE); Uwe Stadelmann, Fuerth (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 644 days.

(21) Appl. No.: 12/964,804

(22) Filed: Dec. 10, 2010

(65) Prior Publication Data

US 2012/0149361 A1    Jun. 14, 2012

(51) Int. Cl.
| | |
|---|---|
| H04B 7/00 | (2006.01) |
| H04W 48/12 | (2009.01) |
| H04W 74/00 | (2009.01) |
| H04W 88/06 | (2009.01) |
| H04W 48/18 | (2009.01) |
| H04W 72/04 | (2009.01) |

(52) U.S. Cl.
CPC .......... H04W 48/12 (2013.01); *H04W 48/18* (2013.01); *H04W 72/0406* (2013.01); *H04W 74/006* (2013.01); *H04W 88/06* (2013.01)

(58) Field of Classification Search
CPC ............ H04W 72/0406; H04W 48/18; H04W 74/006; H04W 88/06
USPC .................. 455/422.1, 434, 435.1, 458, 515
See application file for complete search history.

(56) References Cited

U.S. PATENT DOCUMENTS

| | | | |
|---|---|---|---|
| 6,563,807 B1 * | 5/2003 | Kim | .............. H04W 36/12 370/310 |
| 6,584,116 B1 | 6/2003 | Gourgue et al. | |
| 7,961,707 B2 | 6/2011 | Kim et al. | |
| 2004/0229659 A1 | 11/2004 | Boos et al. | |
| 2006/0223461 A1 * | 10/2006 | Laroia et al. | ............. 455/103 |
| 2009/0262648 A1 * | 10/2009 | Chun | .............. H04W 76/048 370/241 |

(Continued)

FOREIGN PATENT DOCUMENTS

DE    102010025796 A1    1/2012

OTHER PUBLICATIONS

3GPP TS 45002, V6.12.0, Nov. 2005, "3rd Generation Parnership Project; Technical Specification Group GSM/EDGE Radio Access Network; Multiplexing and multiple access on the radio path" (Release 6), pp. 1-92.

(Continued)

*Primary Examiner* — Charles Appiah
*Assistant Examiner* — Jaime Holliday
(74) *Attorney, Agent, or Firm* — Viering, Jentschura & Partner mbB (57) ABSTRACT

According to various embodiments, a mobile radio communication device may be provided. The mobile radio communication device may include a receiver configured to receive information; a requirement determiner configured to determine whether first broadcast information scheduled to be received from a first base station is required; and a receiver controller configured to control the receiver to receive the first broadcast information from the first base station in case it is determined that the first broadcast information is required and to control the receiver to receive second broadcast information from a second base station in case it is determined that the first broadcast information is not required.

24 Claims, 4 Drawing Sheets

(56) References Cited

U.S. PATENT DOCUMENTS

| | | |
|---|---|---|
| 2010/0067448 A1* | 3/2010 | Chin et al. .................. 370/329 |
| 2010/0174809 A1* | 7/2010 | Chun et al. .................. 709/221 |
| 2011/0002258 A1* | 1/2011 | Du ........................ H04W 48/08 370/315 |
| 2012/0004013 A1 | 1/2012 | Esch et al. |
| 2014/0099948 A1* | 4/2014 | Pani et al. .................. 455/434 |

OTHER PUBLICATIONS

Office Action received for Chinese Patent Application No. 201110462583.6, dated Dec. 17, 2014 (4 pages) including English translation (8 pages), 12 pages.

* cited by examiner

MOBILE RADIO COMMUNICATION DEVICES AND METHODS FOR CONTROLLING A MOBILE RADIO COMMUNICATION DEVICE

TECHNICAL FIELD

The present invention relates generally to mobile radio communication devices and methods for controlling a mobile radio communication device.

BACKGROUND

Mobile radio communication devices with a single receiver may receive information from only one base station at a time. In case such a mobile radio communication device is in a mode of continuously receiving information from a base station, it may not be possible for the mobile radio communication device to receive information from another base station, and thus, it may not be possible for the mobile radio communication device to get latest information about a configuration of the other base station.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any embodiment or design described herein as "exemplary" is not necessarily to be construed as preferred or advantageous over other embodiments or designs.

A mobile radio communication device according to various embodiments may be a device configured for wireless communication. In various embodiments, a mobile radio communication device may be an end-user mobile device (MD). In various embodiments, a mobile radio communication device may be any kind of mobile telephone, personal digital assistant, mobile computer, or any other mobile device configured for communication with a mobile communication base station (in other words: with a base station (BS)) or an access point (AP) and may be also referred to as a User Equipment (UE), a mobile station (MS) or an advanced mobile station (advanced MS, AMS), for example in accordance with IEEE 802.16m.

A mobile radio communication device may include a memory which may for example be used in the processing carried out by the mobile radio communication device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Various embodiments are provided for devices, and various embodiments are provided for methods. It will be understood that basic properties of the devices also hold for the methods and vice versa. Therefore, for sake of brevity, duplicate description of such properties may be omitted.

Figure 1:
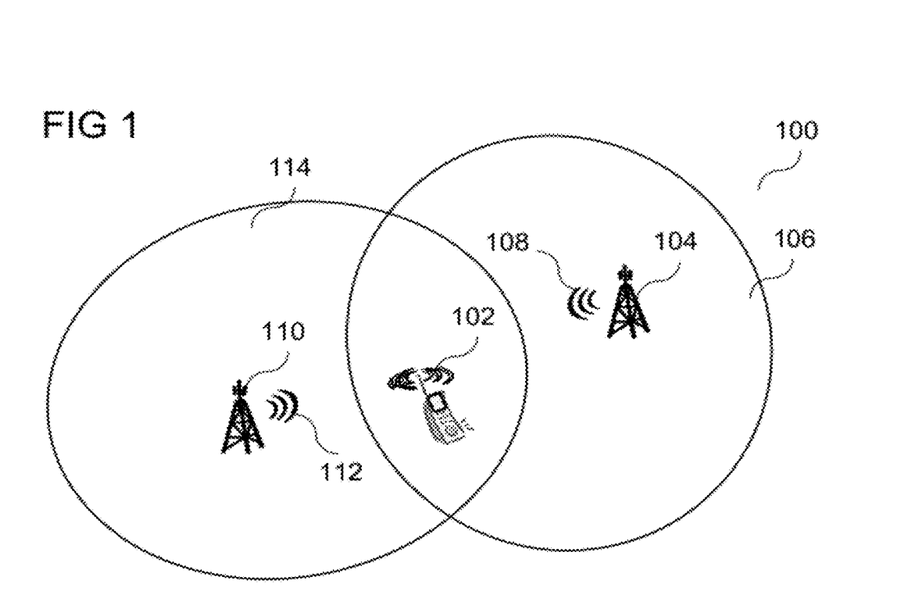
FIG. 1 shows a mobile radio communication system in accordance with an embodiment.

FIG. 1 shows a mobile radio communication system 100 in accordance with an embodiment. In the mobile radio communication system 100, a mobile radio communication device 102 may be in a first coverage area 106, which may be the coverage area of a first base station 104 (in other words: an area, in which a mobile radio communication device may receive information from the first base station 104), and in a second coverage area 114, which may be the coverage area of a second base station 110 (in other words: an area, in which a mobile radio communication device may receive information from the second base station 110). The first base station 104 may transmit broadcast information to all devices in its coverage area 106, like indicated by waves 108. The second base station 110 may transmit broadcast information to all devices in its coverage area 114, like indicated by waves 112.

According to various embodiments, the first base station 104 and the second base station 106 may be different base stations.

For example, mobile radio communication devices with a single receiver may receive information from only one base station at a time. In case such a mobile radio communication device is in a mode of continuously receiving information from a base station, it may not be possible for the mobile radio communication device to receive information from another base station, and thus, it may not be possible for the mobile radio communication device to get latest information about a configuration of the other base station.

For example, in a mode, in which the mobile radio communication device 102 is in a mode of continuously receiving information from the first base station 104, it may not be possible for the mobile radio communication device 102 to receive information from the second base station 110.

According to various embodiments, in a cellular communication system, for example the mobile radio communication system 100, a mobile station (communication device, user equipment, for example the mobile radio communication device 102) may desire to measure, keep synchronization and receive system information messages from multiple network cells (for example a first cell corresponding to the first coverage area 106 and a second cell corresponding to the second coverage area 114), which may belong to different networks (networks from different providers), and which may even use different radio access technologies (for example GERAN (GSM (Global System for Mobile Communications) EDGE (Enhanced Data rates for GSM Evolution) Radio Access Network), UTRAN (UMTS (Universal Mobile Telecommunications System) Terrestrial Radio Access Network), EUTRAN (evolved UMTS Terrestrial Radio Access Network), or any other radio access technology).

According to various embodiments, one of these cells may belong to the network where the mobile station 102 is registered to (serving cell, SCELL, for example the first cell). The mobile station 102 may receive an assigned paging channel on this cell to be reachable for mobile terminated calls and use a random access channel of this cell to request resources for a mobile originated call setup.

According to various embodiments, because this may always have priority over the monitoring of the other cells and an evaluation of a possible re-selection to another cell, the mobile station 102 may be desired to monitor the other cells while it does not have to receive on the SCELL.

According to various embodiments, in a GSM cellular network, the mobile station may sometimes desire to receive on all available paging channels (Common Control Channel, CCCH) and all system information broadcast channels (Broadcast Control Channel, BCCH and BCCH extended), because it has no explicit paging channel assigned (non-DRX, non discontinuous reception mode) or it may desire to receive all system information blocks on the BCCH first before it may determine the assigned paging channel reliable (for example in the case of paging reorganization). According to various embodiments, this may happen due to a state change in the UE as well as being commanded by the network.

For example, within such a non-DRX phase, there may be almost no time to measure, retrieve or maintain synchronization or to receive system information messages from cells not belonging to the same network or radio access technology. According to commonly used methods, the measurements on cells not belonging to the network the mobile station is registered or to a different radio access technology may be suspended, which may lead to incomplete data when the networks expect that the mobile station re-selects to another radio access technology in a specific area, but the mobile station is in non-DRX state when this area is crossed, and in addition, in a Dual SIM Dual Standby (DSDS) system, where the mobile station is registered in, for example two, different networks at the same time, the connection to one network may be lost when the mobile station enters non-DRX state for the other network.

Figure 2:
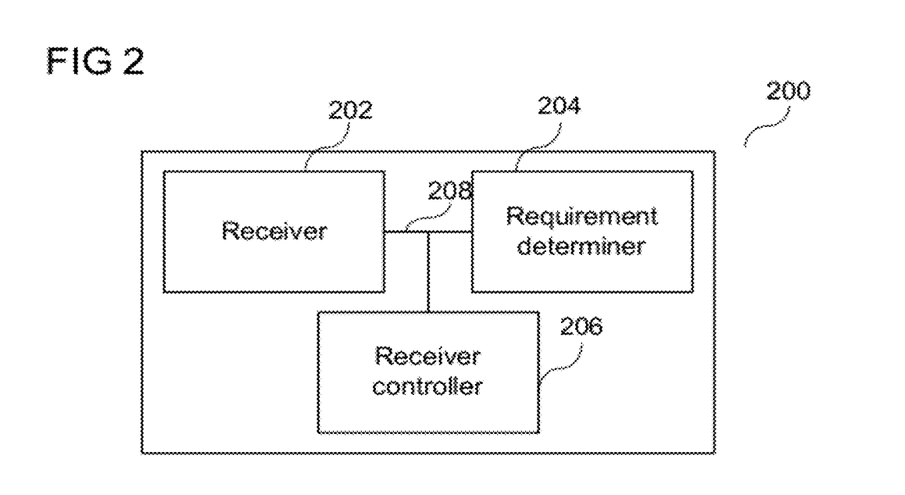
FIG. 2 shows a mobile radio communication device in accordance with an embodiment.

FIG. 2 shows a mobile radio communication device 200 in accordance with an embodiment. According to various embodiments, the mobile radio communication device 200 may include a receiver 202 configured to receive information. According to various embodiments, the mobile radio communication device 200 may further include a requirement determiner 204 configured to determine whether first broadcast information scheduled to be received from a first base station (not shown) is required. According to various embodiments, the mobile radio communication device 200 may further include a receiver controller 206 configured to control the receiver 202 to receive the first broadcast information from the first base station in case it is determined that the first broadcast information is required and to control the receiver 202 to receive second broadcast information from a second base station (not shown) in case it is determined that the first broadcast information is not required. According to various embodiments, the receiver 202, the requirement determiner 204, and the receiver controller 206 may be coupled with each other, e.g. via an electrical connection 208 such as e.g. a cable or a computer bus or via any other suitable electrical connection to exchange electrical signals.

According to various embodiments, the second broadcast information may include at least one of the following information: information related to power level measurements of the second base station; information related to retrieval of synchronization with the second base station; information related to maintenance of synchronization with the second base station; information related to the reception of a cell identifier (e.g. cell ID) of the second base station (e.g. SyncBurst or BSIC (Base Station Identity Code) in GSM); and information related to the confirmation of a cell identifier (e.g. cell ID) of the second base station (e.g. SyncBurst or BSIC in GSM). In other words, reception power level measurements, retrieval or maintenance of synchronization and/or the reception or confirmation of the cell ID (e.g. SyncBurst or BSIC in GSM) may be performed by the mobile radio communication device, when the first information (for example system information from the cell to which the first base station belongs) is not required (in other words: not needed).

According to various embodiments, receiving the second broadcast information from the second base station may be performed not in a context of a handover from the first base station to the second base station.

According to various embodiments, the first base station and the second base station may be different base stations.

According to various embodiments, the requirement determiner 204 may be further configured to determine whether the first broadcast information is required by the mobile radio communication device 200.

According to various embodiments, the requirement determiner 204 may be further configured to determine whether the first broadcast information is required in the mobile radio communication device 200 to have up-to-date configuration data.

According to various embodiments, the requirement determiner 204 may further be configured to determine whether the first broadcast information is required in the mobile radio communication device 200 to have up-to-date system information.

According to various embodiments, the requirement determiner 204 may further be configured to determine whether the first broadcast information is required in the mobile radio communication device 200 to have up-to-date system information of the first base station.

According to various embodiments, the requirement determiner 204 may be further configured to determine whether the first broadcast information is required in the mobile radio communication device 200 to have up-to-date system information of a network to which the first base station belongs.

According to various embodiments, the requirement determiner 204 may be further configured to determine whether the first broadcast information is required in the mobile radio communication device 200 to have up-to-date system information of a cell to which the first base station belongs.

According to various embodiments, the first broadcast information may include or may be a first message.

According to various embodiments, the first message may include or may be a system information message.

According to various embodiments, the second broadcast information may include or may be a second message.

According to various embodiments, the second message may include or may be a system information message.

According to various embodiments, the receiver 202 may be further configured to wirelessly receive information.

According to various embodiments, the receiver 202 may be further configured to receive information from only one of the first base station and the second base station at a time.

According to various embodiments, the first base station and the second base station may be base stations of different networks.

According to various embodiments, the first base station and the second base station may be base stations of different radio access technologies.

According to various embodiments, the first base station and/or the second base station and/or the receiver of the mobile radio communication device 200 may be configured according to at least one radio communication technology of one of the following radio communication technology families:

a Short Range radio communication technology family;

a Metropolitan Area System radio communication technology family;

a Cellular Wide Area radio communication technology family;

a radio communication technology family which includes a radio communication technology in which the access to radio resources is provided in a random manner; and a radio communication technology family which includes a radio communication technology in which the access to radio resources is provided in a centrally controlled manner.

In various embodiments, the first base station and/or the second base station and/or the receiver of the mobile radio communication device 200 may be configured according to at least one of the following radio communication technologies: a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, and Unlicensed Mobile Access (UMA, also referred to as also referred to as 3GPP Generic Access Network, or GAN standard)).

According to various embodiments, each of the first broadcast information and the second broadcast information may be information not addressed to one or more predetermined recipients.

According to various embodiments, the first broadcast information may include or may be configuration data.

According to various embodiments, the first broadcast information may include or may be system information.

According to various embodiments, the first broadcast information may include or may be at least one system information message.

According to various embodiments, the first broadcast information may include or may be system information of the first base station.

According to various embodiments, the first broadcast information may include or may be system information of a network to which the first base station belongs.

According to various embodiments, the first broadcast information may include or may be system information of a cell to which the first base station belongs.

According to various embodiments, the second broadcast information may include or may be configuration data.

According to various embodiments, the second broadcast information may include or may be system information.

According to various embodiments, the second broadcast information may include or may be at least one system information message.

According to various embodiments, the second broadcast information may include or may be system information of the second base station.

According to various embodiments, the second broadcast information may include or may be system information of a network to which the second base station belongs.

According to various embodiments, the second broadcast information may include or may be system information of a cell to which the second base station belongs.

According to various embodiments, the receiver 202 may further be configured to receive the first broadcast information on a broadcast control channel of the first base station.

According to various embodiments, the receiver 202 may further be configured to receive the second broadcast information on a broadcast control channel of the second base station.

According to various embodiments, the requirement determiner 204 may further be configured to determine whether the first broadcast information is required based on broadcast information previously received from the first base station.

Figure 3:
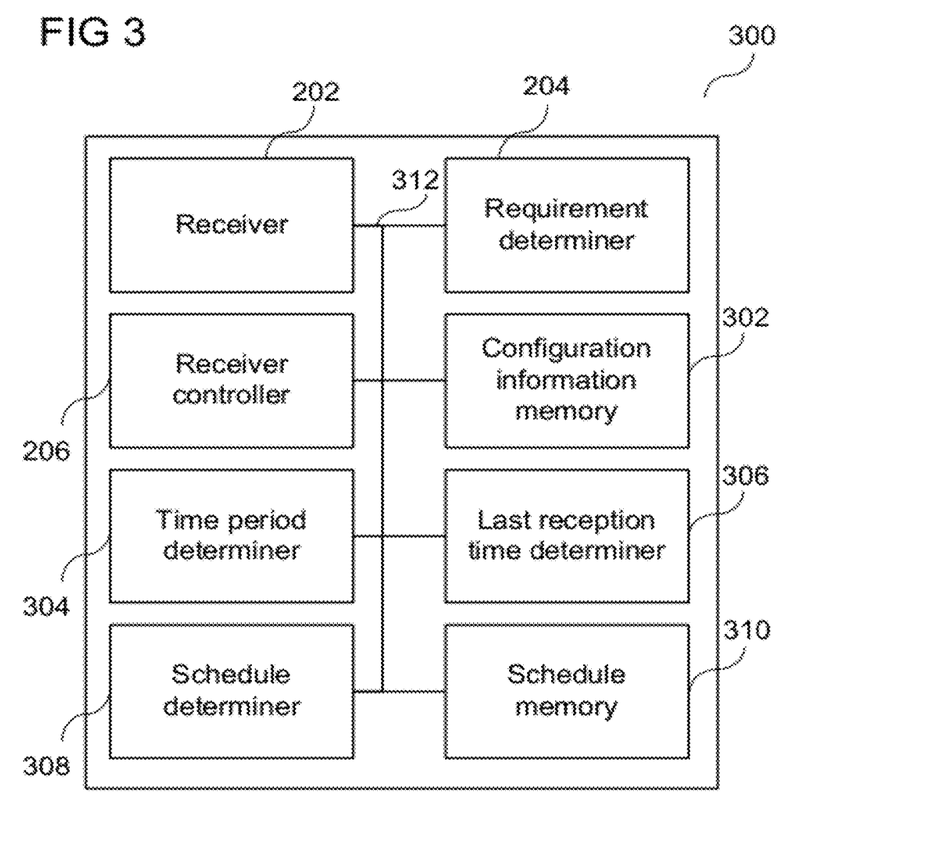
FIG. 3 shows a mobile radio communication device in accordance with an embodiment.

FIG. 3 shows a mobile radio communication device 300 in accordance with an embodiment. According to various embodiments, the mobile radio communication device 300 may, similar to the mobile radio communication device 200 of FIG. 2, include a receiver 202 configured to receive information. According to various embodiments, the mobile radio communication device 300 may, similar to the mobile radio communication device 200 of FIG. 2, further include a requirement determiner 204 configured to determine whether first broadcast information scheduled to be received from a first base station is required. According to various embodiments, the mobile radio communication device 300 may, similar to the mobile radio communication device 200 of FIG. 2, further include a receiver controller 206 configured to control the receiver 202 to receive the first broadcast information from the first base station in case it is determined that the first broadcast information is required and to control the receiver 202 to receive second broadcast information from a second base station in case it is determined that the first broadcast information is not required. According to various embodiments, the mobile radio communication device 300 may further include a configuration information memory 302, like will be described in more detail below. According to various embodiments, the mobile radio communication device 300 may further include a time period determiner 304, like will be described in more detail below. According to various embodiments, the mobile radio communication device 300 may further include a last reception time determiner 306, like will be described in more detail below. According to various embodiments, the mobile radio communication device 300 may further include a schedule determiner 308, like will be described in more detail below. According to various embodiments, the mobile radio communication device 300 may further include a schedule memory 310, like will be described in more detail below. According to various embodiments, the receiver 202, the requirement determiner 204, the receiver controller 206, the configuration information memory 302, the time period determiner 304, the last reception time determiner 306, the schedule determiner 308 and the schedule memory 310 may be coupled with each other, e.g. via an electrical connection 312 such as e.g. a cable or a computer bus or via any other suitable electrical connection to exchange electrical signals.

According to various embodiments, the configuration information memory 302 may be configured to store configuration information of the first base station. According to various embodiments, the requirement determiner 204 may further be configured to determine whether the first broadcast information is required based on the stored configuration information.

According to various embodiments, the requirement determiner 204 may further be configured to determine whether the first broadcast information is required based on a frame number of the first broadcast information.

According to various embodiments, the requirement determiner 204 may further be configured to determine whether the first broadcast information is required based on whether the first broadcast information is important to the mobile radio communication device 300.

According to various embodiments, the requirement determiner 204 may further be configured to determine whether the first broadcast information is required based on whether a content of the first broadcast information is redundant with respect to broadcast information previously received from the first base station. According to various embodiments, in case of good reception conditions, not all bursts transmitting redundant data may be needed (or required) to be received, so that the mobile radio communication device may measure other cells (for example cells different from the cell to which the first base station belongs, for example a cell to which the second base station belongs) at the time the redundant information would be received.

According to various embodiments, the mobile radio communication device 300 may be in a mode of non discontinuous reception with the first base station, like will be explained in more detail below.

According to various embodiments, the time period determiner 304 may be configured to determine a period of time during which the first broadcast information is scheduled to be received from the first base station. According to various embodiments, the receiver controller may further be configured to control the receiver 202 to receive the first broadcast information from the first base station during the determined period of time in case it is determined that the first broadcast information is required and to control the receiver 202 to receive second broadcast information from a second base station during the determined period of time in case it is determined that the first broadcast information is not required.

According to various embodiments, the last reception time determiner 306 may be configured to determine a period of time since a pre-determined configuration information has been lastly received from the first base station. According to various embodiments, the requirement determiner 204 may further be configured to determine whether the first broadcast information is required based on the period of time.

According to various embodiments, controlling the receiver 202 to receive the first broadcast information from the first base station may include or may be controlling the receiver 202 to receive information from the first base station on a pre-determined first channel.

According to various embodiments, controlling the receiver 202 to receive the second broadcast information from the second base station may include or may be controlling the receiver to receive information from the second base station on a pre-determined second channel.

According to various embodiments, the schedule determiner 308 may be configured to determine which information, for example which type of information, is scheduled to be received as the first broadcast information.

According to various embodiments, the schedule determiner 308 may further be configured to determine which information, for example which type of information, is scheduled to be received as the first broadcast information based on other broadcast information previously received from the first base station.

According to various embodiments, the schedule memory 310 may be configured to store schedule information about a schedule of transmission of broadcast information from the first base station, for example position information like will be described in more detail below. According to various embodiments, the schedule determiner 308 may further be configured to determine which information, for example which type of information, is scheduled to be received as the first broadcast information based on the schedule information.

Figure 4:
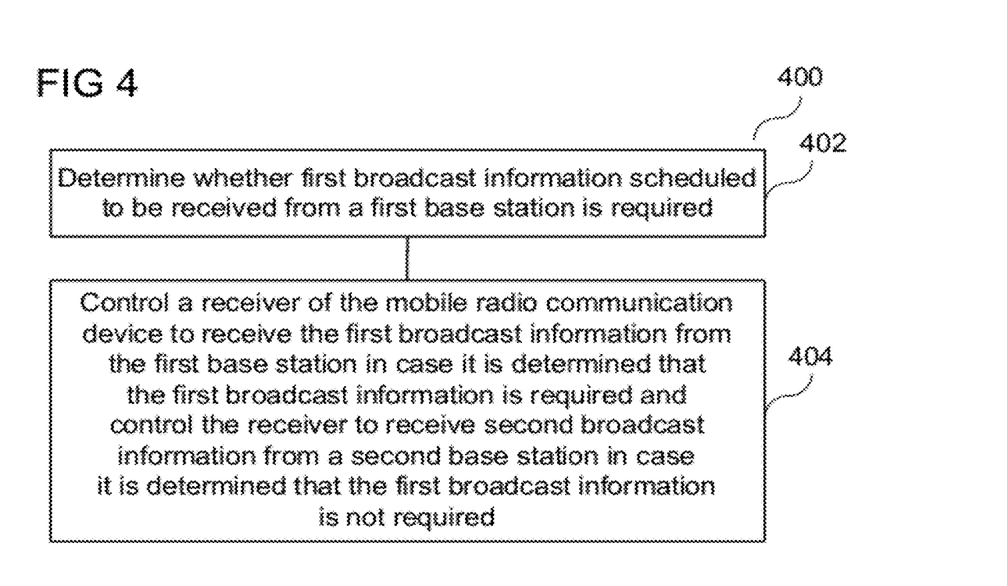
FIG. 4 shows a flow diagram illustrating a method for controlling a mobile radio communication device in accordance with an embodiment.

FIG. 4 shows a flow diagram 400 illustrating a method for controlling a mobile radio communication device in accordance with an embodiment. According to various embodiments, in 402, it may be determined whether first broadcast information scheduled to be received from a first base station is required. According to various embodiments, in 404, a receiver may be controlled to receive the first broadcast information from the first base station in case it is determined that the first broadcast information is required and the receiver may be controlled to receive second broadcast information from a second base station in case it is determined that the first broadcast information is not required.

According to various embodiments, the second broadcast information may include at least one of the following information: information related to power level measurements of the second base station; information related to retrieval of synchronization with the second base station; information related to maintenance of synchronization with the second base station; information related to the reception of a cell identifier (e.g. cell ID) of the second base station (e.g. SyncBurst or BSIC in GSM); and information related to the confirmation of a cell identifier (e.g. cell ID) of the second base station (e.g. SyncBurst or BSIC in GSM). In other words, reception power level measurements, retrieval or maintenance of synchronization and/or the reception or confirmation of the cell ID (e.g. SyncBurst or BSIC in GSM) may be performed by the mobile radio communication device, when the first information (for example system information from the cell to which the first base station belongs) is not required (in other words: not needed).

According to various embodiments, receiving the second broadcast information from the second base station may be performed not in a context of a handover from the first base station to the second base station.

According to various embodiments, the first base station and the second base station may be different base stations.

According to various embodiments, it may be determined whether the first broadcast information is required by the mobile radio communication device.

According to various embodiments, it may be determined whether the first broadcast information is required in the mobile radio communication device to have up-to-date configuration data.

According to various embodiments, it may be determined whether the first broadcast information is required in the mobile radio communication device to have up-to-date system information.

According to various embodiments, it may be determine whether the first broadcast information is required in the mobile radio communication device to have up-to-date system information of the first base station.

According to various embodiments, it may be determined whether the first broadcast information is required in the mobile radio communication device to have up-to-date system information of a network to which the first base station belongs.

According to various embodiments, it may be determined whether the first broadcast information is required in the mobile radio communication device to have up-to-date system information of a cell to which the first base station belongs.

According to various embodiments, the first broadcast information may include or may be a first message.

According to various embodiments, the first message may include or may be a system information message.

According to various embodiments, the second broadcast information may include or may be a second message.

According to various embodiments, the second message may include or may be a system information message.

According to various embodiments, information may be received wirelessly.

According to various embodiments, information may be received from only one of the first base station and the second base station at a time.

According to various embodiments, the first base station and the second base station may be base stations of different networks.

According to various embodiments, the first base station and the second base station may be base stations of different radio access technologies.

According to various embodiments, the first base station and/or the second base station and/or the receiver of the mobile radio communication device may perform radio communication according to at least one radio communication technology of one of the following radio communication technology families:

a Short Range radio communication technology family;

a Metropolitan Area System radio communication technology family;

a Cellular Wide Area radio communication technology family;

a radio communication technology family which includes a radio communication technology in which the access to radio resources is provided in a random manner; and a radio communication technology family which includes a radio communication technology in which the access to radio resources is provided in a centrally controlled manner.

In various embodiments, the first base station and/or the second base station and/or the receiver of the mobile radio communication device may perform radio communication according to at least one of the following radio communication technologies: a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, and Unlicensed Mobile Access (UMA, also referred to as also referred to as 3GPP Generic Access Network, or GAN standard)).

According to various embodiments, each of the first broadcast information and the second broadcast information may be information not addressed to one or more predetermined recipients.

According to various embodiments, the first broadcast information may include or may be configuration data.

According to various embodiments, the first broadcast information may include or may be system information.

According to various embodiments, the first broadcast information may include or may be at least one system information message.

According to various embodiments, the first broadcast information may include or may be system information of the first base station.

According to various embodiments, the first broadcast information may include or may be system information of a network to which the first base station belongs.

According to various embodiments, the first broadcast information may include or may be system information of a cell to which the first base station belongs.

According to various embodiments, the second broadcast information may include or may be configuration data.

According to various embodiments, the second broadcast information may include or may be system information.

According to various embodiments, the second broadcast information may include or may be at least one system information message.

According to various embodiments, the second broadcast information may include or may be system information of the second base station.

According to various embodiments, the second broadcast information may include or may be system information of a network to which the second base station belongs.

According to various embodiments, the second broadcast information may include or may be system information of a cell to which the second base station belongs.

According to various embodiments, the first broadcast information may be received on a broadcast control channel of the first base station.

According to various embodiments, the second broadcast information may be received on a broadcast control channel of the second base station.

According to various embodiments, it may be determined whether the first broadcast information is required based on broadcast information previously received from the first base station.

According to various embodiments, the method may further include storing configuration information of the first base station. According to various embodiments, it may be determined whether the first broadcast information is required based on the stored configuration information.

According to various embodiments, it may be determined whether the first broadcast information is required based on a frame number of the first broadcast information.

According to various embodiments, it may be determined whether the first broadcast information is required based on whether the first broadcast information is important to the mobile radio communication device.

According to various embodiments, it may be determined whether the first broadcast information is required based on whether a content of the first broadcast information is redundant with respect to broadcast information previously received from the first base station. According to various embodiments, in case of good reception conditions, not all bursts transmitting redundant data may be needed to be received, so that the mobile radio communication device may measure other cells (for example cells different from the cell to which the first base station belongs, for example a cell to which the second base station belongs) at the time the redundant information would be received.

According to various embodiments, the mobile radio communication device may be in a mode of non discontinuous reception with the first base station, like will be explained in more detail below.

According to various embodiments, the method may further include determining a period of time during which the first broadcast information is scheduled to be received from the first base station. According to various embodiments, the receiver may be controlled to receive the first broadcast information from the first base station during the determined period of time in case it is determined that the first broadcast information is required and the receiver may be controlled to receive second broadcast information from a second base station during the determined period of time in case it is determined that the first broadcast information is not required.

According to various embodiments, the method may further include determining a period of time since a pre-determined configuration information has been lastly received from the first base station. According to various embodiments, it may be determined whether the first broadcast information is required based on the period of time.

According to various embodiments, controlling the receiver to receive the first broadcast information from the first base station may include or may be controlling the receiver to receive information from the first base station on a pre-determined first channel.

According to various embodiments, controlling the receiver to receive the second broadcast information from the second base station may include or may be controlling the receiver to receive information from the second base station on a pre-determined second channel.

According to various embodiments, the method may further include determining which information, for example which type of information, is scheduled to be received as the first broadcast information.

According to various embodiments, it may be determined which information, for example which type of information, is scheduled to be received as the first broadcast information based on other broadcast information previously received from the first base station.

According to various embodiments, the method may further include storing schedule information about a schedule of transmission of broadcast information from the first base station. According to various embodiments, it may be determined which information, for example which type of information, is scheduled to be received as the first broadcast information based on the schedule information.

Figure 5:
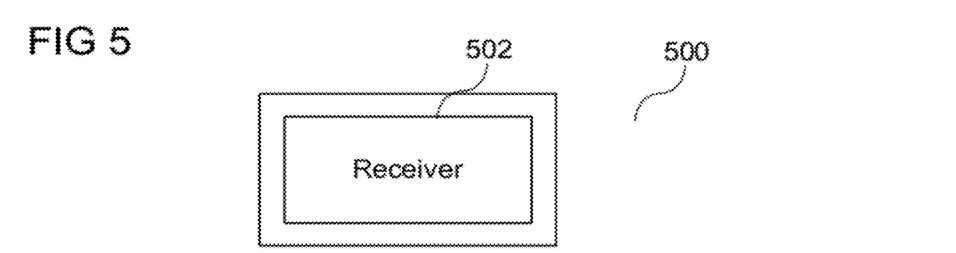
FIG. 5 shows a mobile radio communication device in accordance with an embodiment.

FIG. 5 shows a mobile radio communication device 500 in accordance with an embodiment. According to various embodiments, the mobile radio communication device 500 may include a receiver 502 configured to receive broadcast information from a second base station (not shown) in case it is determined that broadcast information scheduled to be received from a first base station (not shown) is not desired by the mobile radio communication device, and to receive broadcast information from the first base station otherwise.

Figure 6:
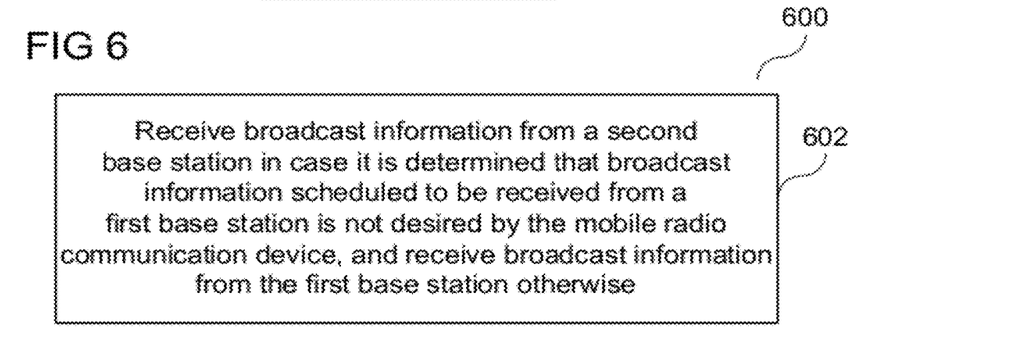
FIG. 6 shows a flow diagram illustrating a method for controlling a mobile radio communication device in accordance with an embodiment.

FIG. 6 shows a flow diagram 600 illustrating a method for controlling a mobile radio communication device in accordance with an embodiment. According to various embodiments, in 602, broadcast information may be received from a second base station in case it is determined that broadcast information scheduled to be received from a first base station is not desired by the mobile radio communication device, and broadcast information may be received from the first base station otherwise.

Figure 7:
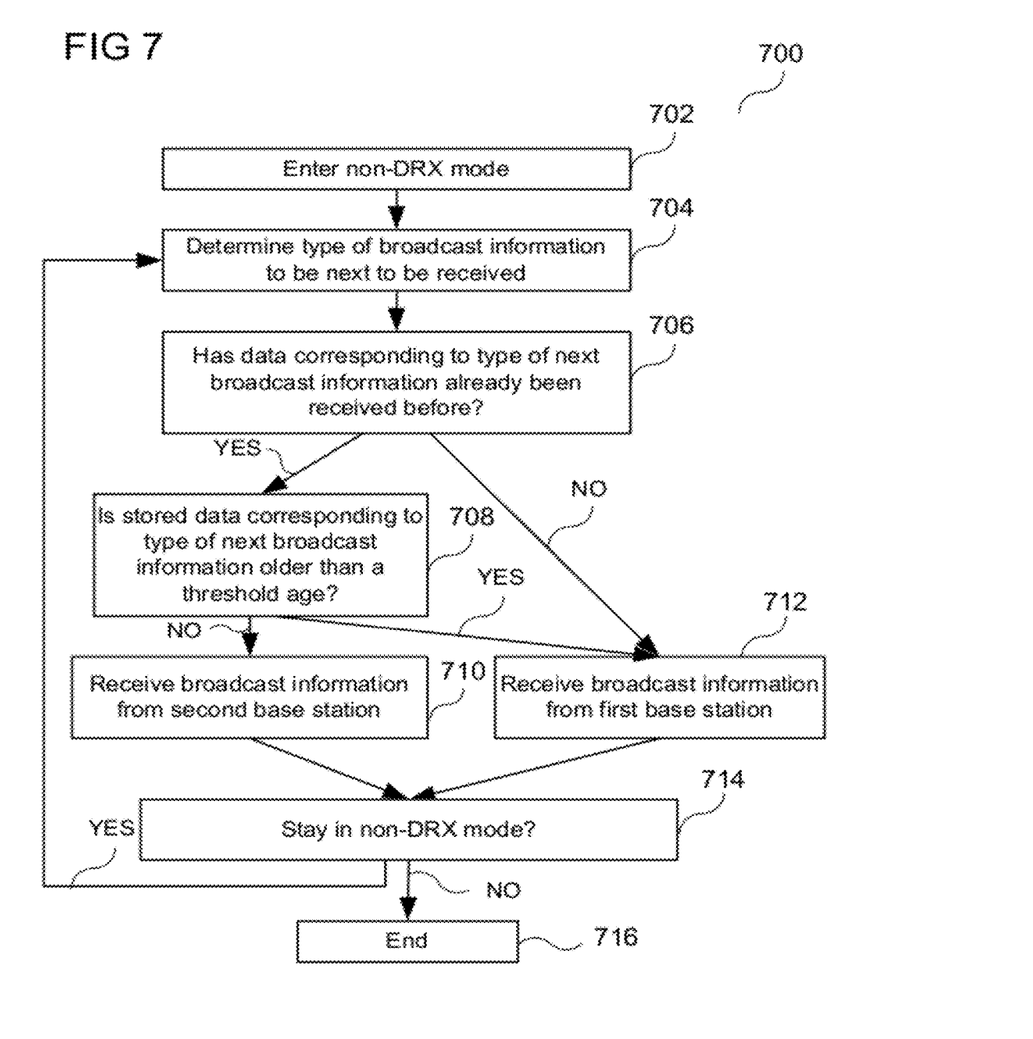
FIG. 7 shows a flow diagram illustrating a method for controlling a mobile radio communication device in accordance with an embodiment.

FIG. 7 shows a flow diagram 700 illustrating a method for controlling a mobile radio communication device in accordance with an embodiment. In accordance with various embodiments, in 702, the mobile radio communication device may enter a non-DRX mode (a non discontinuous reception mode) with a first base station, for example a mode in which the first base station may continuously receive information from the first base station.

In accordance with various embodiments, in 704, the mobile radio communication device may determine the type of broadcast information to be next to be received. According to various embodiments, the mobile radio communication device may have a memory that stores the type of broadcast information in relation to a frame number, so that the mobile radio communication device may determine the type of the next broadcast message based on the frame number of the next broadcast message. In accordance with various embodiments, the mobile radio communication device may have received information related to the type of broadcast information to be next to be transmitted by the first base station in a previously received broadcast information.

In accordance with various embodiments, in 706 the mobile radio communication device may determine, whether it has already received data corresponding to the type of the next broadcast information before. According to various embodiments, in case the mobile radio communication device has received data corresponding to the type of the next broadcast information already before, processing in the mobile radio communication device may continue in 708. According to various embodiments, in case the mobile radio communication device has not yet received data corresponding to the type of the next broadcast information before, processing in the mobile radio communication device may continue in 712.

In accordance with various embodiments, in 708 the mobile radio communication device may determine whether the data corresponding to the type of next broadcast information is older than a threshold age. According to various embodiments, in case the stored data is older than the threshold age, processing in the mobile radio communication device may continue in 712. According to various embodiments, in case the stored data is not older than the threshold age, processing in the mobile radio communication device may continue in 710.

In accordance with various embodiments, in 710 the mobile radio communication device may receive broadcast information, for example one broadcast message, from a second base station.

In accordance with various embodiments, in 712 the mobile radio communication device may receive broadcast information, for example one broadcast message, from the first base station.

In accordance with various embodiments, in 714 the mobile radio communication device may determine whether it will stay in the non-DRX mode. According to various embodiments, in case the mobile radio communication device stays in the non-DRX mode, processing in the mobile radio communication device may continue in 704. According to various embodiments, in case the mobile radio communication device does not stay in the non-DRX mode, processing in the mobile radio communication device may continue in 716.

In accordance with various embodiments, in 716 processing according to the embodiment may end and may continue with other processing in the mobile radio communication device.

According to various embodiments, it may be checked in the mobile radio communication device which system information messages are already received and which instances of the BCCH or BCCH extended are desired to be received and which ones can be skipped because all system information messages to be sent on this instance are already received.

According to various embodiments, the mobile station may use these gaps to perform monitoring on other networks and radio access technologies.

According to various embodiments, under some conditions BCCH and CCCH blocks may be decoded already after 1 or 2 or 3 of the 4 bursts have been received. According to various embodiments, the remaining 3 to 1 TDMA (time division multiple access) frames may be used by the mobile station to perform the required monitoring on the other networks and radio access technologies. For example, data in a pre-determined number, for example 4, of bursts may be redundant, and in case the first two bursts may be received without error, the data included in the pre-determined number of bursts may be completely decoded without receiving the remaining bursts.

According to various embodiments, the TDMA frames where the Frequency Control Channel (FCH) and the Synchronization Channel (SCH) may be transmitted as well as the idle frame (if not needed for serving cell operations) may be used by the mobile station to perform monitoring on the other networks and radio access technologies.

According to various embodiments, devices and methods may be provided so that the mobile station may monitor other networks and radio access technologies even when it is operating in non-DRX or paging reorganization state.

According to various embodiments, by this, the mobile station may show good performance when the network redirects it from GSM to another radio access technology (for example UMTS or LTE) at the end of a speech call.

According to various embodiments, in a Dual SIM Dual Standby system, the mobile station may not lose synchronization to one SCELL when the network of the other SCELL force it into the non-DRX state and it may get back into service on the other SCELL quick when a dedicated channel is released on one SCELL.

According to various embodiments, the mobile station may decide, for example based on a scheduling scheme (for example position information like will be described in more detail below) of system information messages, like will be explained in more detail below, and if a missing system information message may be located on the upcoming instance of the BCCH or BCCH extended channel, and in case a missing system information message may be located on the upcoming instance of the BCCH or BCCH extended, the mobile station may receive this information, and the mobile station may skip the reception on this instance if does not happen (in other words: if a missing system information message may not be located on the upcoming instance of the BCCH or BCCH extended).

According to various embodiments, instead, the time where this channel instances are transmitted by the SCELL may be used to perform the required monitoring on the other networks and radio access technologies.

According to various embodiments, most of the instances of the BCCH and BCCH extended channel may carry on one type of system information, so that the mobile station may receive only one time here.

According to various embodiments, some System Information messages may be transmitted in defined multiframes and defined blocks within one multiframe, as will be described in more detail below. According to various embodiments, for some System Information messages, the position where they may be transmitted may be contained in other System Information messages. According to various embodiments, the mobile radio communication device may store the position information, and may determine whether the broadcast information is required based in the position information.

According to various embodiments, broadcast information may be transmitted with a periodicity of 8 type codes, each containing 51 frames.

According to various embodiments, type code (TC) may be computed by TC=(FN DIV 51) mod(8)), wherein FN may denote the frame number.

According to various embodiments, a position information table stored in the mobile radio communication device may have the structure of storing the type of a system information message in relation to the TC when it is sent and its allocation (on normal BCCH (BCCH Norm) or on the extended BCCH (BCCH Ext)).

An example for a position information table according to various embodiments is given in table 1.

TABLE 1

Position information table

| System Information Message | Sent when TC = | Allocation |
|---|---|---|
| Type 1 | 0 | BCCH Norm |
| Type 2 | 1 | BCCH Norm |
| Type 2 bis | 5 | BCCH Norm |
| Type 2 ter | 5 or 4 | BCCH Norm |
| Type 2 quater | 5 or 4 or 5 | BCCH Norm BCCH Ext |
| Type 2n | 4 or 4 | BCCH Norm BCCH Ext |
| Type 3 | 2 and 6 | BCCH Norm |
| Type 4 | 3 and 7 | BCCH Norm |
| Type 7 | 7 | BCCH Ext |
| Type 8 | 3 | BCCH Ext |
| Type 9 | 4 | BCCH Norm |
| Type 13 | 4 or 0 | BCCH norm BCCH Ext |
| Type 13 alt | 4 or 0 | BCCH norm BCCH Ext |
| Type 15 | 4 or 1 | BCCH Norm BCCH Ext |
| Type 16 | 6 | BCCH Ext |
| Type 17 | 2 | BCCH Ext |
| Type 18 | Not fixed | Not fixed |
| Type 19 | Not Fixed | Not Fixed |
| Type 20 | Not fixed | Not fixed |

According to various embodiments, the network may send any System Information (SI) message when sending of a specific System Information message is not desired. According to various embodiments, the following rules may apply:

i) BCCH Ext may share the resource with PCH (Paging Channel) and AGCH (Access Grant Channel).

ii) System Information Type 1 may be sent if frequency hopping is in use or when the NCH (Notification Channel)

is present in a cell. If the radio communication device, for example mobile station (MS), finds another message when TC=0, it may assume that System Information Type 1 is not in use.

iii) System information type 2 bis or 2 ter messages may be sent if needed, as determined by the system operator. If only one of them is needed, it may be sent when TC=5. If both are needed, 2 bis may be sent when TC=5 and 2 ter may be sent at least once within any of 4 consecutive occurrences of TC=4. A SI 2 message may be sent at least every time TC=1. System information type 2 quarter may be sent if needed, as determined by the system operator. If sent on BCCH Norm, it may be sent when TC=5 if neither of 2 bis and 2 ter are used, otherwise it may be sent at least once within any of 4 consecutive occurrences of TC=4. If sent on BCCH Ext, it may be sent at least once within any of 4 consecutive occurrences of TC=5.

iv) The definitions of BCCH Norm and BCCH Ext may be given according to a mobile radio communication standard, for example according to a 3GPP radio communication standard.

v) Use of System Information type 7 and 8 may not always be necessary. It may be necessary if System Information type 4 does not contain all information needed for cell selection and reselection.

vi) System Information type 9 may be sent in those blocks with TC=4 which may be specified in system information type 3 as defined in a mobile radio communication standard, for example in a 3GPP radio communication standard.

vii) System Information type 13 may only be related to a GPRS service. System Information Type 13 may only be sent if GPRS support is indicated in one or more of System Information Type 3 or 4 or 7 or 8 messages. These messages may also indicate if the message is sent on the BCCH Norm or if the message is transmitted on the BCCH Ext. In the case that the message is sent on the BCCH Norm, it may be sent at least once within any of 4 consecutive occurrences of TC=4.

viii) System Information type 16 and 17 may only be related to a SoLSA (Support Of Location Service Area) service.

ix) System Information type 18 and 20 may be sent in order to transmit non-GSM broadcast information. The frequency with which they are sent may be determined by the system operator. System Information type 9 may identify the scheduling of System Information type 18 and 20 messages.

x) System Information Type 19 may be sent if COMPACT neighbors exist. If System Information Type 19 is present, then its scheduling may be indicated in System Information Type 9.

xi) System Information Type 15 may be broadcast if dynamic ARFCN (absolute radio frequency channel number) mapping is used in the PLMN (Public land mobile network). If sent on BCCH Norm, it may be sent at least once within any of 4 consecutive occurrences of TC=4. If sent on BCCH Ext, it may be sent at least once within any of 4 consecutive occurrences of TC=1.

xii) System Information type 13 alt may be only related to the GERAN Iu mode. System Information Type 13 alt may only be sent if GERAN Iu mode support is indicated in one or more of System Information Type 3 or 4 or 7 or 8 messages and SI 13 is not broadcast. These messages may also indicate if the message is sent on the BCCH Norm or if the message is transmitted on the BCCH Ext. In the case that the message is sent on the BCCH Norm, it may be sent at least once within any of 4 consecutive occurrences of TC=4.

xiii) System Information Type 2n may be optionally sent on BCCH or BCCH Ext if needed, as determined by the system operator. In the case that the message is sent on the BCCH Norm, it may be sent at least once within any of 4 consecutive occurrences of TC=4. If the message is sent on BCCH Ext, it may be sent at least once within any of 2 consecutive occurrences of TC=4.

According to various embodiments, the mobile radio communication device may evaluate the rules described above, and may determine whether the broadcast information from the first base station is required or not based on the evaluation.

According to various embodiments, a multi mode mobile station which supports GSM, UMTS, LTE and others may be provided, where the time when the obsolete BCCH and BCCH extended channel instances are send by the SCELL may be used to perform measurements on other radio access technologies when it is camped on GSM.

According to various embodiments, a Dual SIM Dual Standby mobile station may be provided, where the times when the obsolete BCCH and BCCH extended channel instances are sending be the SCELL may be used to perform measurements on the other SCELL and on the neighbor cells belonging to the other SCELL.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile radio communication device, comprising:
a receiver configured to receive information over a wireless communication network;
a receiver controller configured to control the receiver to receive system information messages according to a predetermined reception schedule specified by the wireless communication network;
a requirement determiner configured to determine whether the mobile radio communication device remains in a non-discontinuous mode based on at least two of:
whether a broadcast information type of the system information message scheduled to be received has already been received;
whether data is stored that corresponds to the broadcast information type of the system information message scheduled to be received; and
whether the stored data corresponding to a broadcast information type of the system information message is older than a threshold age; and
a time period determiner configured to determine a first time period during which the system information message is scheduled to be received from a first serving cell according to the predetermined reception schedule; and
the receiver controller further configured to control the receiver to receive the system information message from the first serving cell during the determined first time period in the case that it is determined that the system information message is required and to control the receiver to skip reception of the system information message in order to receive broadcast information from a second cell during the determined first time period in the case that it is determined that the system information message is not required.

2. The mobile radio communication device of claim 1, wherein the broadcast information may include at least one information selected from a list of information consisting of:
information related to power level measurements of the second cell;
information related to retrieval of synchronization with the second cell;
information related to maintenance of synchronization with the second cell;
information related to the reception of a cell identifier of the second cell; and
information related to the confirmation of a cell identifier of the second cell.

3. The mobile radio communication device of claim 1, wherein the requirement determiner is further configured to determine whether the system information message is required in the mobile radio communication device to have up-to-date system information.

4. The mobile radio communication device of claim 1, wherein the predetermined reception schedule directs the mobile radio communication device to receive the system information message during the first period, and wherein the receiver controller is further configured to skip reception of the system information message during the first time period in the case that the requirement determiner determines that the system information message is not required in order to receive the broadcast information from the second cell.

5. The mobile radio communication device of claim 1, further comprising:
a system information parameter memory configured to store system information parameters of the first serving cell;
wherein the requirement determiner is further configured to determine whether the system information message is required based on the stored system information parameters.

6. The mobile radio communication device of claim 1, wherein the requirement determiner is further configured to determine whether the system information message is required based on a frame number of the system information message.

7. The mobile radio communication device of claim 1, wherein the requirement determiner is further configured to determine whether the system information message is required based on whether a system parameter in the system information message is redundant with respect to a system information parameter in another system information message previously received from the first serving cell.

8. The mobile radio communication device of claim 1, wherein the predetermined reception schedule is associated with a non-discontinuous reception (non-DRX) mode of the mobile radio communication device.

9. The mobile radio communication device of claim 1, further comprising:
a last reception time determiner configured to determine a period of time since a pre-determined system information parameter has been lastly received from the first serving cell;
wherein the requirement determiner is further configured to determine whether the system information message is required based on the period of time.

10. The mobile radio communication device of claim 1, further comprising:
a schedule determiner configured to determine a system information parameter type for a system information parameter that is scheduled to be received in the system information message.

11. The mobile radio communication device of claim 10, wherein the schedule determiner is further configured to determine the system information parameter type for the system information parameter that is scheduled to be received in the system information message based on other system information messages previously received from the first serving cell.

12. The mobile radio communication device of claim 1, wherein the requirement determiner is configured to determine based on all three characteristics.

13. A method for controlling a mobile radio communication device, comprising:
determining whether the mobile radio communication device remains in a non-discontinuous mode based on at least two of:
whether a broadcast information type of the system information message scheduled to be received has already been received;
whether data is stored that corresponds to the broadcast information type of the system information message scheduled to be received; and
whether the stored data corresponding to a broadcast information type of the system information message is older than a threshold age;
determining a period of time during which a predetermined reception schedule directs the mobile communication device to receive the system information message from a first serving cell, wherein the predetermined reception schedule is specified by a wireless communication network for reception of system information messages; and
controlling a receiver of the mobile radio communication device to receive the system information message from the first serving cell during the determined first time period in the case that it is determined that the system information message is required and controlling the receiver to skip reception of the system information message in order to receive broadcast information from a second cell during the determined first time period in the case that it is determined that the system information message is not required.

14. The method of claim 13, further comprising:
wherein the broadcast information may include at least one information selected from a list of information consisting of:
information related to power level measurements of the second cell;
information related to retrieval of synchronization with the second cell;
information related to maintenance of synchronization with the second cell;
information related to the reception of a cell identifier of the second cell; and
information related to the confirmation of a cell identifier of the second cell.

15. The method of claim 13, further comprising:
determining whether the system information message is required in the mobile radio communication device to have up-to-date system information.

16. The method of claim 13,
wherein the determining whether a system information message scheduled to be received from a first serving cell is required generates a first determination result,
wherein the determining a first time period during which the system information is scheduled to be received takes place after the first determination result is generated, and
wherein the controlling a receiver of the mobile radio communication device to receive the system information message from the first serving cell during the determined period of time is performed according to the first determination result and controlling the receiver to receive broadcast information from the second cell during the determined period of time is performed according to the first determination result.

17. The method of claim 13, further comprising:
storing system information parameters of the first serving cell; and
determining whether the system information message is required based on the stored system information parameters.

18. The method of claim 13,
determining whether the system information message is required based on a frame number of the system information message.

19. The method of claim 13,
determining whether the system information message is required based on whether the system parameter in the system information message is redundant with respect to a system information parameter in another system information message previously received from the first serving cell.

20. The method of claim 13, further comprising:
determining a period of time since a pre-determined system information parameter has been lastly received from the first serving cell; and
determining whether the system information message is required based on the period of time.

21. The method of claim 13, further comprising:
determining the type of system information parameter that is scheduled to be received in the system information message.

22. The method of claim 21, further comprising:
determining the type of system information parameter that is scheduled to be received in the system information message based on other system information messages previously received from the first serving cell.

23. A mobile radio communication device, comprising:
a requirement determiner configured to determine whether a mobile radio communication device remains in a non-discontinuous mode based on at least two of:
 a broadcast information type of the system information message scheduled to be received;
 whether data is stored that corresponds to the broadcast information type of the system information message scheduled to be received; and
 whether the stored data corresponding to a broadcast information type of the system information message is older than a threshold age; and
a time period determiner configured to determine a first time period during which a predetermined reception schedule specified by a wireless communication network directs the mobile radio communication device to receive the system information message from a first serving cell; and
a receiver configured to skip reception of the first system information message in order to receive broadcast information from a second cell during the first time period in the case that it is determined that the system information message scheduled to be received from the first serving cell is not required by the mobile radio communication device, and to receive the system information message from the first serving cell during the pre-determined period of time otherwise.

24. A method for controlling a mobile radio communication device, comprising:
controlling a receiver to receive system information messages from a first serving cell according to a predetermined reception schedule specified by a wireless communication network;
determining whether or not a mobile radio communication device remains in a non-discontinuous mode based on at least two of:
 a broadcast information type of the system information message scheduled to be received;
 whether data is stored that corresponds to the broadcast information type of the system information message scheduled to be received; and
 whether the stored data corresponding to a broadcast information type of the system information message is older than a threshold age; and
skipping reception of the system information message in order to receive broadcast information from a second cell during the first time period in the case that it is determined that the system information message scheduled to be received from the first serving cell is not required by the mobile radio communication device.

* * * * *